United States Patent
Tanner (10) Patent No.: US 7,136,248 B2
(45) Date of Patent: Nov. 14, 2006

(54) SPINDLE SPEED CONTROL USING FEED-FORWARD ESTIMATION IN A HARD DISK DRIVE

(75) Inventor: Brian K. Tanner, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/062,978

(22) Filed: Feb. 22, 2005

(65) Prior Publication Data

US 2006/0187566 A1    Aug. 24, 2006

(51) Int. Cl.
*G11B 15/46* (2006.01)
(52) U.S. Cl. .................................. 360/73.03
(58) Field of Classification Search ............. None
See application file for complete search history.

(56) References Cited

U.S. PATENT DOCUMENTS 5,216,647 A * 6/1993 Kitani ................ 369/44.28
5,473,230 A   12/1995 Dunn et al.

OTHER PUBLICATIONS

Davis, Michael W., "A New Spin on Suspension Windage," Insight, Mar./Apr. 2001, pp. 8-12.
"Neon Filled Hard Drive to Reduce Power Consumption," www.priorartdatabase.com/IPCOM/000013939/, Jan. 20, 2004.

* cited by examiner

*Primary Examiner*—Hoa T. Nguyen
*Assistant Examiner*—Mitchell Slavitt
(74) *Attorney, Agent, or Firm*—Fliesler Meyer LLP (57) ABSTRACT

A method is applied to reduce a range in variation of a target spin speed for a rotatable medium in a data storage device. The method includes rotating the rotatable medium at the target spin speed, determining an initial position of a head relative to a surface of the rotatable medium, determining a target position of the head relative to the surface of the rotatable medium, calculating an adjusted spin speed based on the initial position and the target position, sending a signal to rotate the rotatable medium at the adjusted spin speed, repositioning the head from the initial position to the target position, and sending a signal to rotate the rotatable medium at the target spin speed.

17 Claims, 9 Drawing Sheets

SPINDLE SPEED CONTROL USING FEED-FORWARD ESTIMATION IN A HARD DISK DRIVE

FIELD OF THE INVENTION

The present invention relates to data storage devices, and methods for positioning heads over rotating media in data storage devices.

BACKGROUND

Over the past few years, notebook computers have become progressively thinner and lighter, and battery technology has improved significantly; but, though both thinner and lighter, notebook computers have incorporated evermore powerful CPU's, larger and higher resolution screens, more memory and higher capacity hard disk drives. Feature-rich models include a number of peripherals such as high-speed CD-ROM drives, DVD drives, fax/modem capability, and a multitude of different plug-in PC cards. Each of these features and improvements creates demand for power from system batteries. Many portable electronics, such as MP3 players and personal digital assistants, now use rotatable data storage devices as well, and by their nature and size place great demands for power on batteries.

Many manufacturers of rotatable data storage devices reduce demand on batteries by employing power savings schemes; for example, many manufacturers ramp down and stop a rotating storage medium after a period of inactivity. Rotating the storage medium can consume power and it can be desirable to implement schemes that minify the amount of excess power consumed in rotating the storage medium. A scheme to reduce excess power consumption can include improving the ability of a rotating storage medium to maintain spin speed when rotating to avoid consuming power to correct the spin speed.

BRIEF DESCRIPTION OF THE DRAWINGS

Further details of embodiments of the present invention are explained with the help of the attached drawings in which.

DETAILED DESCRIPTION

Figure 1:
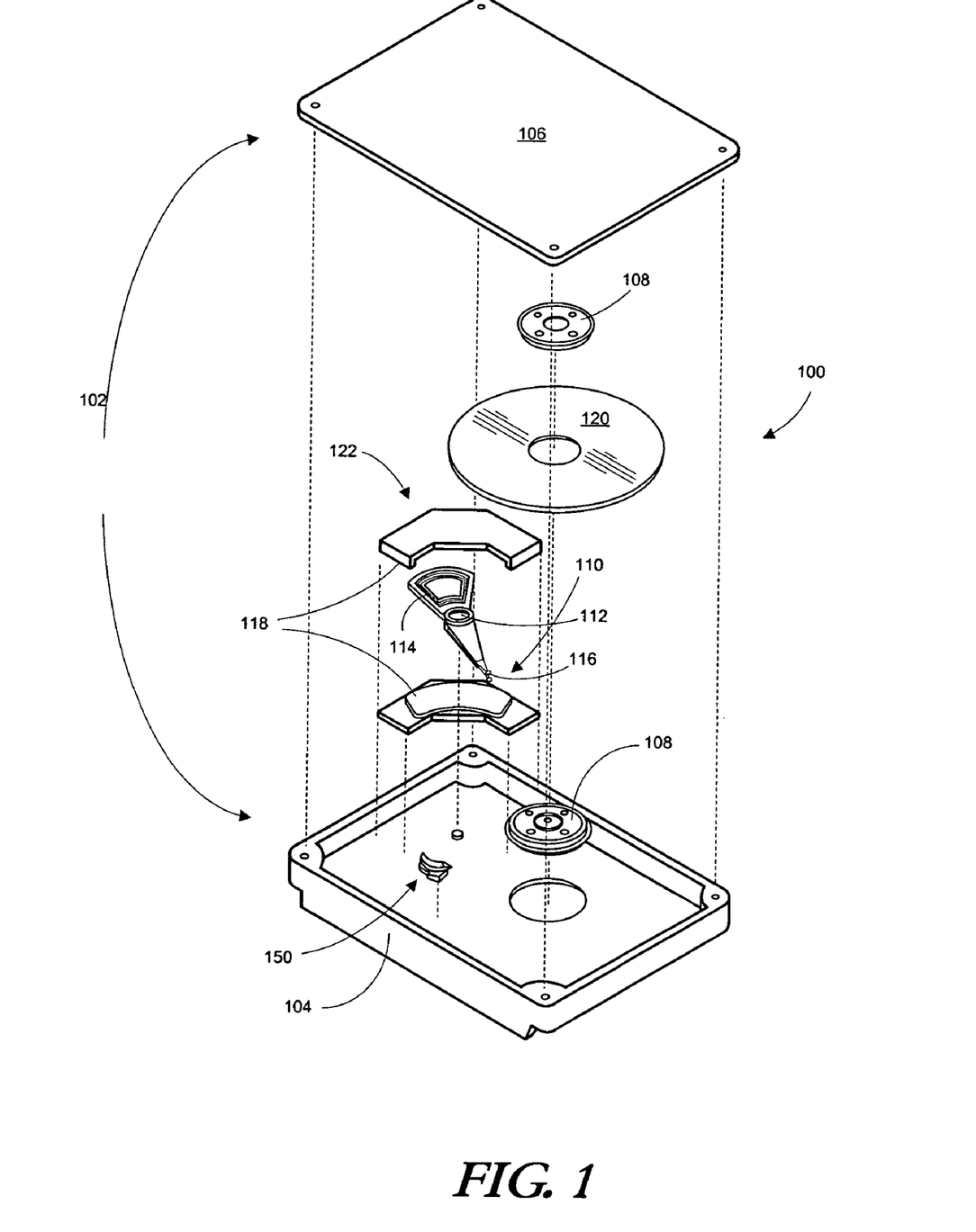
FIG. 1 is an exploded view of an exemplary hard disk drive for use with embodiments of methods in accordance the present invention.

FIG. 1 is an exploded view of an exemplary hard disk drive 100 for applying an embodiment of a method in accordance with the present invention. The hard disk drive 100 includes a housing 102 comprising a housing base 104 and a housing cover 106. The housing base 104 as illustrated is a base casting, but alternatively can comprise separate components assembled prior to or during assembly of the hard disk drive 100. A spindle 108 can be connected with the housing base 104. A disk 120 is attached to the rotatable spindle 108, for example by clamping. The disk 120 can be made of a light aluminum alloy, ceramic/glass or other suitable substrate, with magnetizable material deposited on one or both sides of the disk 120. The magnetic layer has tiny domains of magnetization for storing data transferred through one or more heads 116. In an embodiment, the head 116 is a magnetic transducer adapted to read data from the disk 120 and write data to the disk 120. The disk 120 can be rotated at a constant or varying rate typically ranging from less than 3,600 to more than 15,000 RPM (speeds of 4,200 and 5,400 RPM are common in hard disk drives designed for mobile devices such as laptop computers). The invention described herein is equally applicable to technologies using other media, as for example, optical media. Further, the invention described herein is equally applicable to devices having any number of disks 120 attached to the hub of the spindle 108. In other embodiments, the head 116 includes a separate read element and write element. For example, the separate read element can be a magneto-resistive (MR) head and the write element can be an inductive head. It will be understood that multiple head 116 configurations can be used.

A rotary actuator 110 is pivotally mounted to the housing base 104 by a bearing 112 and sweeps an arc between an inner diameter (ID) of the disk 120 and a ramp 150 optionally positioned near an outer diameter (OD) of the disk 120. Attached to the housing base 104 are upper and lower magnet return plates 118 and at least one magnet that together form the stationary portion of a voice coil motor (VCM) 122. A voice coil 114 is mounted on the rotary actuator 110 and positioned in an air gap of the VCM 122. The rotary actuator 110 pivots about the bearing 112 when current is passed through the voice coil 114 and pivots in an opposite direction when the current is reversed, allowing for precise positioning of the head 116 along the radius of the disk 120. The VCM 122 is coupled with a servo system (described in detail below) that uses positioning data read by the head 116 from the disk 120 to determine the position of the head 116 over tracks on the disk 120. The servo system determines an appropriate current to drive through the voice coil 114, and drives the current through the voice coil 114 using a VCM current driver and associated circuitry.

Each side of a disk 120 can have an associated head 116, and the heads 116 are collectively coupled to the rotary actuator 110 such that the heads 116 pivot in unison. The invention described herein is equally applicable to devices wherein the individual heads separately move some small distance relative to the actuator. This technology is referred to as dual-stage actuation (DSA). Each head 116 associated with a corresponding side of the disk 120 can be positioned over the disk surface, beneath the disk surface, or adjacent to the disk surface. The relative position of the head 116 is dependent on the orientation of the disk 120 and/or the orientation of the hard disk drive 100. The position of each head 116 relative to a corresponding surface is thus herein referred to as being "over" the disk surface, which is understood to mean in close proximity to the disk surface, whether over, beneath or adjacent to the disk surface.

Figure 2:
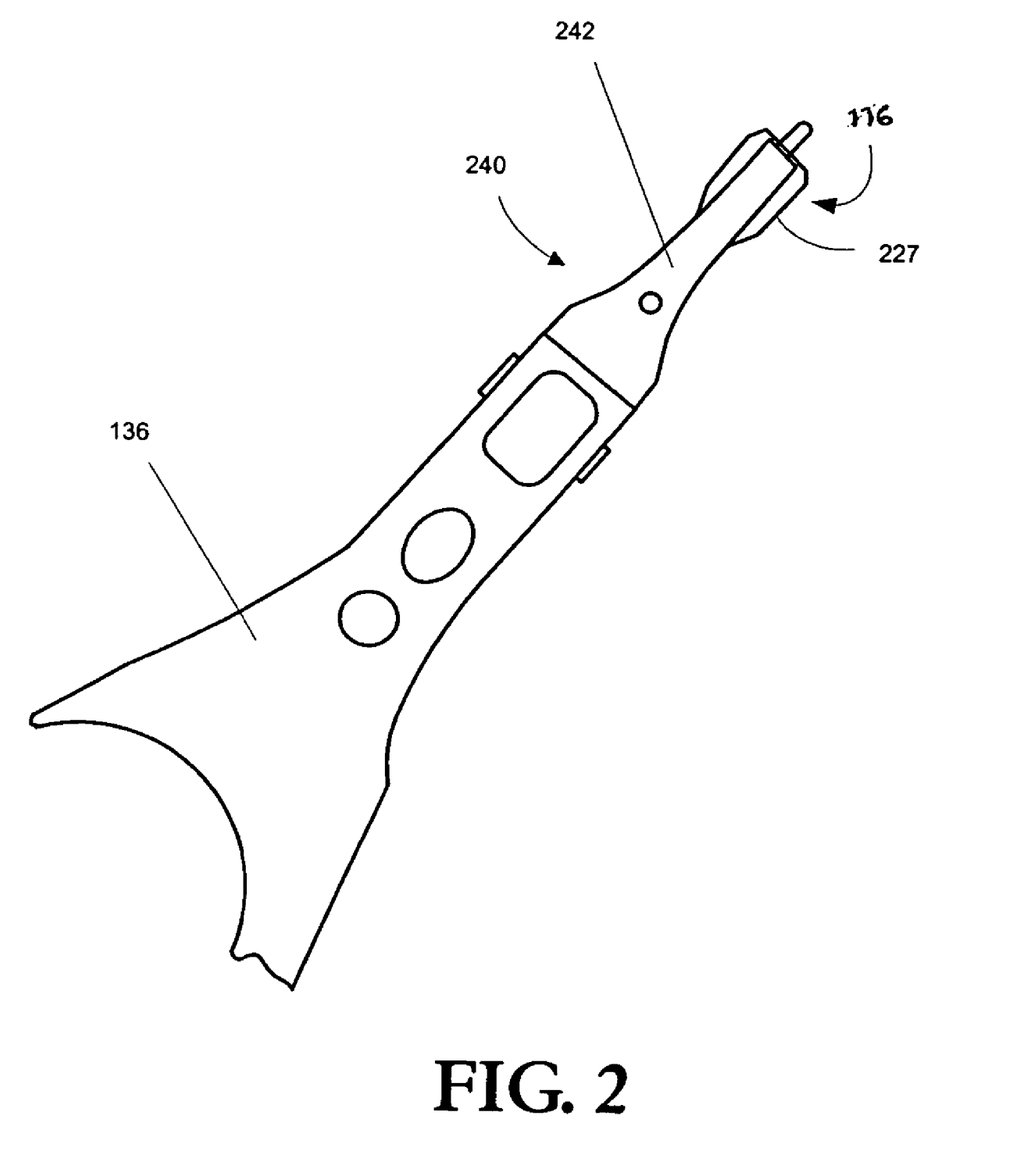
FIG. 2 is a close-up view of a head suspension assembly of the exemplary hard disk drive of FIG. 1.

FIG. 2 details an example of a subassembly commonly referred to as a head suspension assembly (HSA) 240, comprising the head 116 attached to a slider 227, which is further connected with a flexible suspension member (a suspension) 242. The suspension 242 can be connected with an arm 136 which in an embodiment can be either integrally formed with a mount for a bearing 132 or separately attached to the mount. The head 116 can be formed on the slider 227 using a number of different techniques, for example the head 116 and slider 227 can be manufactured on a single die using semiconductor processing (e.g. photolithography and reactive ion etching). Spinning of the disk 120 increases air pressure beneath the slider 227, creating a thin air bearing that lifts the slider 227 (and consequently the head 116) off of the surface of the disk 120. A micro-gap of typically less than one micro-inch can be maintained between the disk 120 and the head 116 in an embodiment. The suspension 242 can be bent or shaped to act as a spring such that a force is applied to the disk 120 surface. The air bearing resists the spring force applied by the suspension 242. The opposition of the spring force and the air bearing to one another allows the head 116 to trace the surface contour of the rotating disk 120 (which is likely to have minute warpage) without "crashing" against the disk 120 surface. When a head 116 "crashes," the head 116 collides with the disk 120 surface such that the head 116 and/or the disk 120 surface may be damaged. As is well understood by those of ordinary skill in the art, not all heads ride an air bearing as described above. This invention is also meant to apply to contact recording heads and heads of optical and magneto-optical storage devices that have rotating media.

Figure 3:
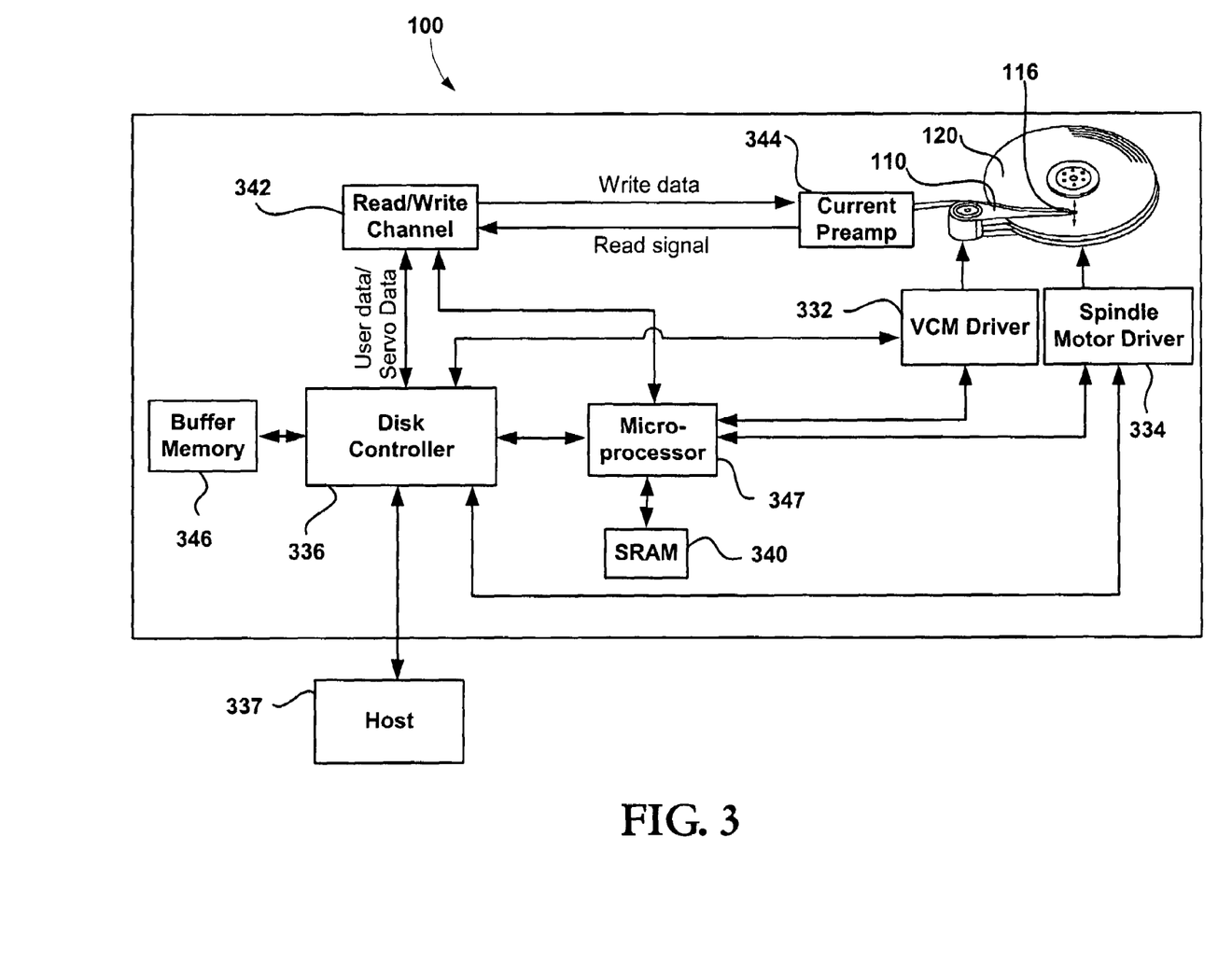
FIG. 3 is a control schematic for the exemplary hard disk drive of FIG. 1.

FIG. 3 is a control schematic for the exemplary hard disk drive 100. A servo system for positioning the head 116 can comprise a microprocessor 347 and a servo controller which can exist as circuitry within the hard disk drive 100 or as an algorithm resident in the microprocessor 347, or as a combination thereof. In other embodiments, an independent servo controller can be used. The servo system uses positioning data read by the head 116 from the disk 120 to determine the position of the head 116 over tracks on the disk 120. When the servo system receives a command to position a head 116 over a track, the servo system determines an appropriate current to drive and commands a VCM driver 332 electrically connected with the voice coil 114 to drive the current through the voice coil 116. The servo system can further include a spindle motor driver 334 to drive current through the spindle motor, and a disk controller 336 for receiving information from a host 337 and for controlling multiple disk functions. The host 337 can be any device, apparatus, or system capable of utilizing the hard disk drive 100, such as a personal computer or Web server. An interface controller can be included for communicating with the host 337, or the interface controller can be included in the disk controller 336. In other embodiments, the servo controller, VCM driver 332, and spindle motor driver 334 can be integrated into a single application specific integrated circuit (ASIC). One of ordinary skill in the art can appreciate the different means for controlling the spindle motor and the VCM 122.

The disk controller 336 provides user data to a read/write channel 342, which sends signals to a current amplifier or a preamplifier 344. The current amplifier or preamplifier 344 is electrically connected with the head 116 via a flex circuit (not shown), and sends write signals to the head 116. The disk controller 336 can also send servo signals to the microprocessor 347. The disk controller 336 can include a memory controller for interfacing with buffer memory 346. In an embodiment, the buffer memory 346 can be DRAM. The microprocessor 347 can include integrated memory (such as cache memory), or the microprocessor 347 can be electrically connected with external memory (for example, static random access memory (SRAM) 340 or alternatively dynamic random access memory (DRAM)).

Information stored on a disk 120 can be written in concentric tracks, extending from near the ID to near the OD. In a sectored (or embedded)-type servo system tracks contain small segments of servo information written in servo wedges or servo sectors preceding corresponding user data sectors. Tracks can contain an equal number of servo wedges, spaced relatively evenly around the circumference of the track. Hard disk drive designs have been proposed having different numbers of servo wedges on different tracks, and such hard disk drive designs can also benefit from embodiments of methods in accordance with the invention contained herein. In a system where the actuator 110 rotates about a pivot point such as a bearing, the servo wedges need not extend linearly from the ID to the OD, but may be curved slightly in order to adjust for the trajectory of the head 116 as it sweeps across the disk 120.

As the disk 120 spins and the disk surface passes beneath the head 116, the head 116 can read servo information so that the servo system can determine positioning of the head 116 over the disk surface. As described above, the disk 120 can be rotated at an approximately constant speed (a target speed) as the head 116 reads from the disk 120 or writes to the disk 120. The linear velocity of the disk 120 surface relative to the head 116 varies, increasing from the ID to the OD in proportion to the radius of the disk 120 at a location on the disk 120 over which the head 116 passes. For example, a data track on the disk surface one inch from the center of the disk 120 can have a linear velocity relative to the head 116 twice that of a data track one-half inch from the center of the disk 120. Hard disk drive schemes have been proposed in which the linear velocity of the disk is kept constant. Such schemes require that the angular velocity of the disk 120 vary, increasing when reading or writing tracks closer to the center of the disk 120. Such disk driving schemes can also benefit from embodiments of methods in accordance with the present invention.

Figure 4A:
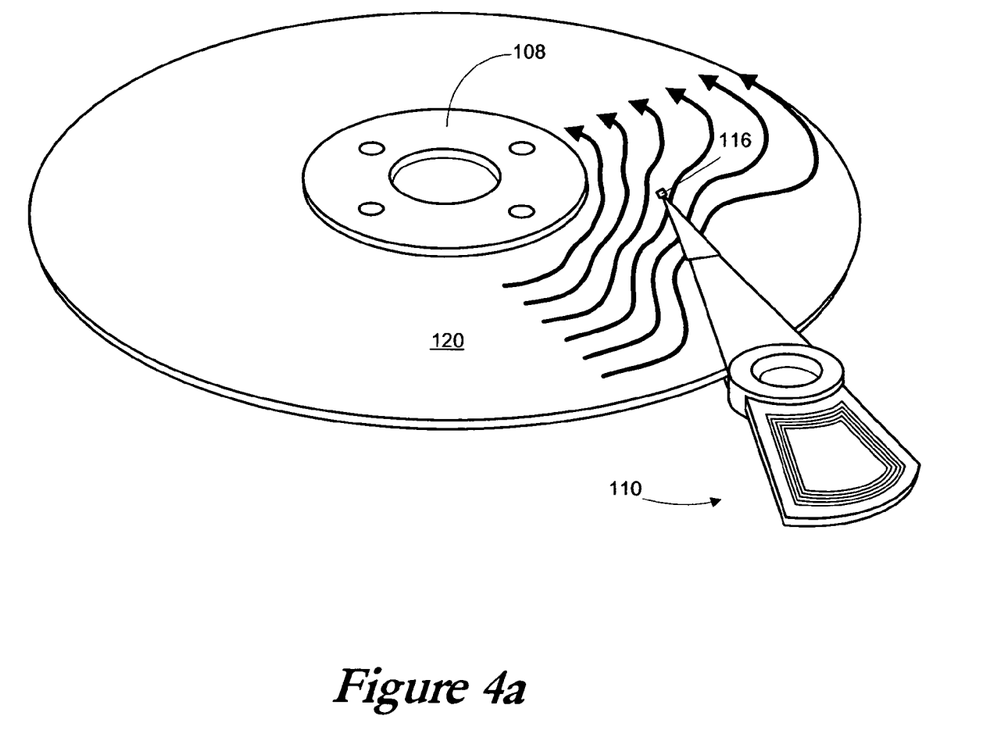
FIG. 4A illustrates airflow across the surface of a rotating disk when a head operably associated with a rotary actuator of the exemplary hard disk drive of FIG. 1 is positioned near an inner diameter of the disk.

The slider 227 on which the head 116 is attached applies a frictional drag force on the disk 120 that translates to load torque on the spindle motor. The drag force results from an interaction between the slider 227 and air circulating around the disk 120 as the disk 120 rotates. Two competing forces contribute to the drag force exerted on the disk 120. Spinning of the disk 120 increases air pressure beneath the slider 227, creating a thin air bearing between the slider 227 and the disk surface. Friction exists between the air bearing and the disk 120 in proportion to the velocity of the air circulating around the disk 120 as the disk 120 rotates, and the viscosity of the air. As the head 116 moves toward the center of the disk 120, the air bearing suffers less relative linear velocity between the slider 227 and the disk 120 because the linear velocity of the portion of the disk surface passing under the head 116 decreases. Referring to FIG. 4A, when the actuator 110 pivots to position the head 116 near the ID, the partial intrusion of the actuator 110 into the airflow can create turbulent effects that result in occlusion of the flow near the slider 227, increasing windage energy interacting with the slider 227. The turbulent airflow (represented by black flow lines) is partially directed toward the HSA 240 by the actuator 110, which acts as a funnel. As the cross-sectional area of the flow region becomes restricted, in accordance with the principle of conservation of mass flow, the fluid density and/or the velocity must increase to account for the smaller cross-sectional area, causing increased interaction between the airflow and the slider 227. The increased interaction between the turbulent air and the slider 227 as the slider 227 nears the ID can result in increased drag on the disk 120.

Figure 4B:
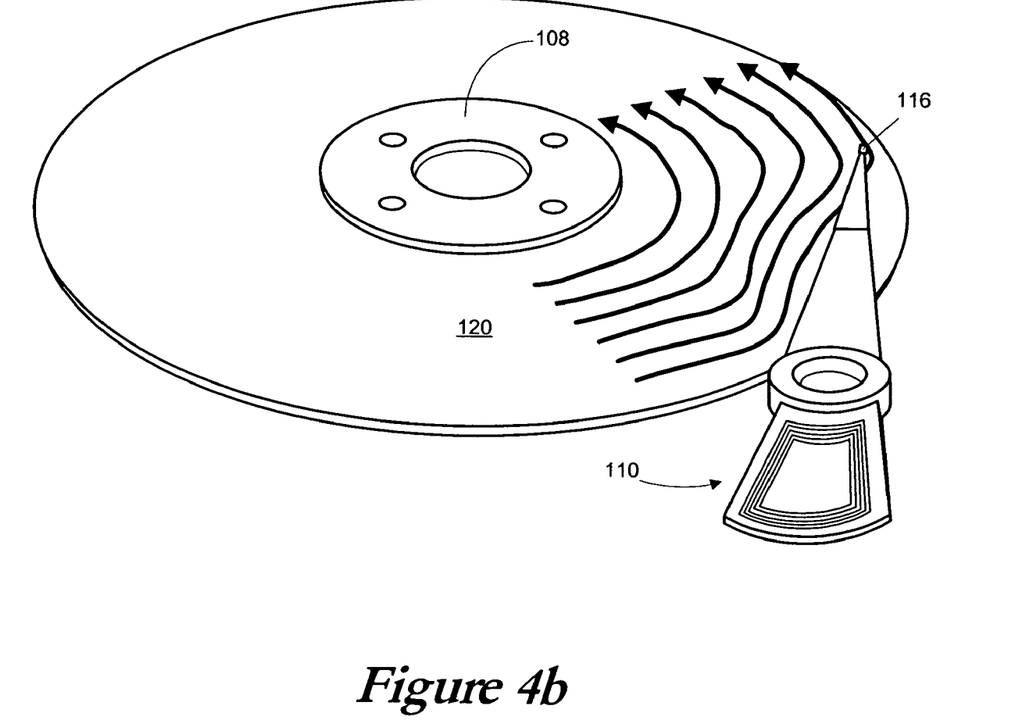
FIG. 4B illustrates airflow across the surface of the rotating disk of FIG. 4A when the head is positioned near an outer diameter of the disk.

Airflow occlusion and linear velocity are variables influencing interaction between the slider 227 and the disk 120 that act as competing forces. For example, in an embodiment the total drag on the disk decreases as the head moves toward the ID, despite an increase in airflow occlusion. Referring to FIG. 4B, as the actuator 110 pivots to position the head 116 near the OD the airflow becomes less turbulent and occlusion diminishes, but the linear velocity of the circulating air increases, causing the total drag on the disk 120 to increase. In other embodiments, the opposite is true: pivoting the actuator 110 to move the head 116 toward the ID increases total drag, while pivoting the actuator 110 to move the head 116 toward the OD decreases total drag. It is possible for the drag-inducing forces to balance such that drag on the spindle 108 is roughly the same independent of radius. Often the two drag-inducing forces do not balance and drag on the disk 120 increases or decreases as the head 116 moves across the disk surface. The load torque applied to the spindle motor varies as the drag on the disk 120 varies, causing the spindle 108 to slow down or speed up.

The servo system reads and writes data on the disk 120 at consistent rates. The size of bursts written to the disk surface varies in relation to the variation in linear velocity across the radius of the disk 120 relative to a position of the head 116. The servo system performs optimally when the disk 120 rotates at consistent rates and cannot predictably compensate for variations in spin speed when writing and reading data on the disk 120 (an exception is as described above for schemes where the linear velocity is constant and the spin speed varies). Therefore, it can be desirable to maintain the disk 120 at a constant angular velocity as the head 116 performs seeks across the disk surface. Performing seeks in either direction can increase or decrease the additional load torque applied to the spindle motor, the magnitude and result of the additional load torque depending on the target spin speed, number of disks, disk spacing, rigidity and construction of the actuator arm 136, etc. Further, the effects of the additional load torque can vary. For example, the effects can be more pronounced in small form factor hard disk drives 100—as used in laptops or other portable devices—where inertia of the disk 120 and total torque of the spindle motor is generally small relative to larger form factor hard disk drives. Some servo systems compensate for variation in load torque on the spindle motor by including a spindle motor driver 334 having a transconductance amplifier. Such servo systems modify the demanded current applied to the spindle transconductance amplifier by a precise amount related to the load variation.

A servo system having a closed-loop spindle motor driver 334 applies current to the spindle motor to maintain the spindle 108 at a target spin speed. When the spindle 108 slows down or speeds up with variation in drag force, the closed-loop system recovers to spin at the target speed. The settling time for a closed-loop system can be undesirably long. One such hard disk drive 100 having a closed-loop spindle motor driver 334 can be modeled using simulation software, for example such as MATLAB® and Simulink®. The simulation model applied to produce the results shown in FIGS. 5A–7 is based on an existing combo motor driver ASIC including an integrated hardware-based spindle speed controller. The spindle speed controller includes a programmable frequency and phase lock loop (PLL) architecture that gives high spindle speed accuracy (relative to the state of the art) in a steady state condition. The spindle speed controller can have relatively significant settling times due to limited spindle speed control bandwidth (e.g., approximately 10 Hz). Actuator 110 movements can be faster than the spindle speed controller. As a result, spindle speed disturbances can corrupt user data exchanges and/or detection of head positioning data where the spindle load torque varies substantially with the radial position of the head 116. A typical technique of a closed-loop system to minify spindle speed disturbance can include using a feed forward control based on the radial position of the head 116 that introduces a spindle motor current to supply a corresponding spindle torque to substantially counteract changes in spindle load torque dependent on the radial position of the head 116.

An embodiment of a system in accordance with the present invention can include a combo motor driver ASIC having a programming feature for defining a target rotational speed of the disk 120 when the combo motor driver ASIC is in a hardware spindle speed control mode. The combo motor driver ASIC can optionally include a firmware spindle speed mode where the spindle speed is controlled via a firmware control program that can apply the typical technique using feed forward control; however, the typical technique need not be applied where power dissipation is a concern (i.e., applying the typical technique can result in undesirable power dissipation). The hardware spindle speed control mode inhibits implementation of the typical technique using feed forward. The combo motor driver ASIC can implement a spindle speed control where the only available method of modulation of spindle motor applied torque that exists for the hardware spindle speed control mode in the combo motor driver ASIC is used to counteract the changes in spindle load torque due to changes in radial position of the head 116. The spindle speed target value is modulated based on the radial position of the head 116.

Figure 5A:
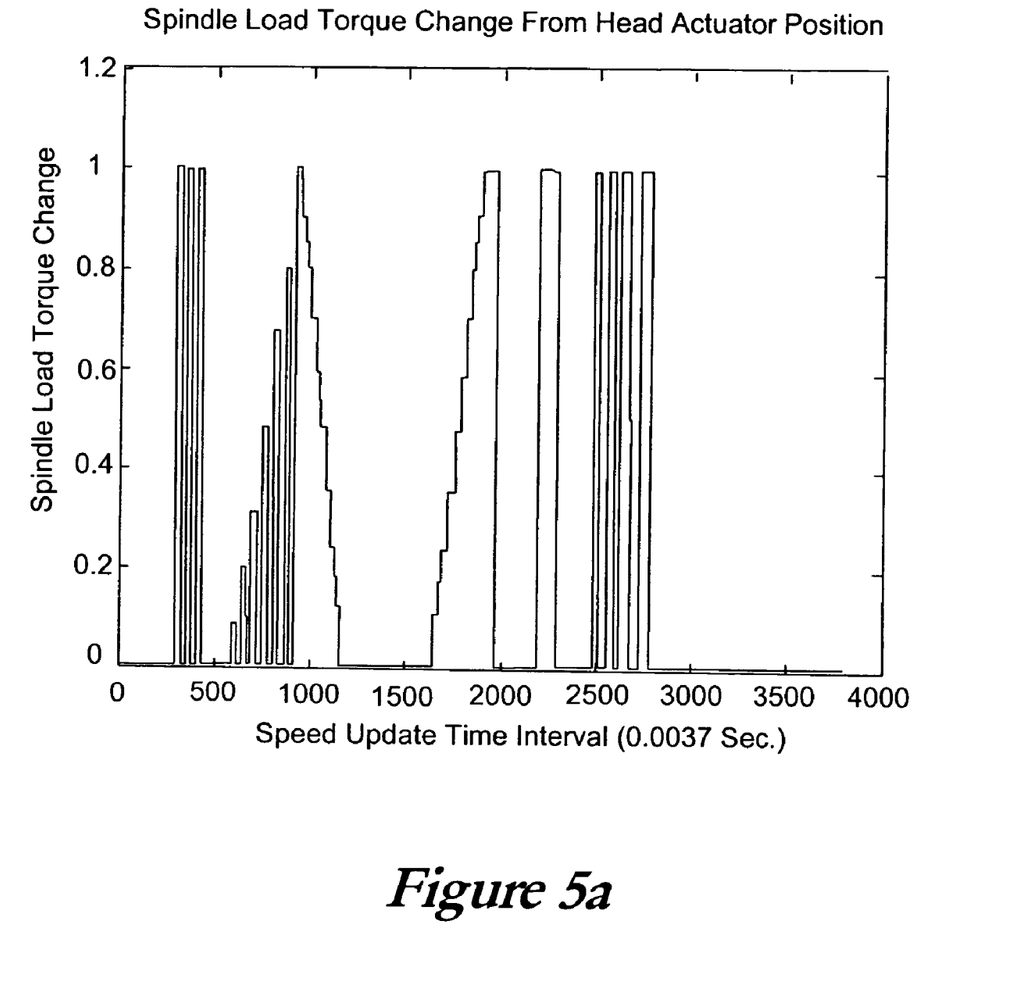
FIG. 5A is a plot of simulation results illustrating a change in load torque of a spindle motor of the exemplary hard disk drive over time.
Figure 5B:
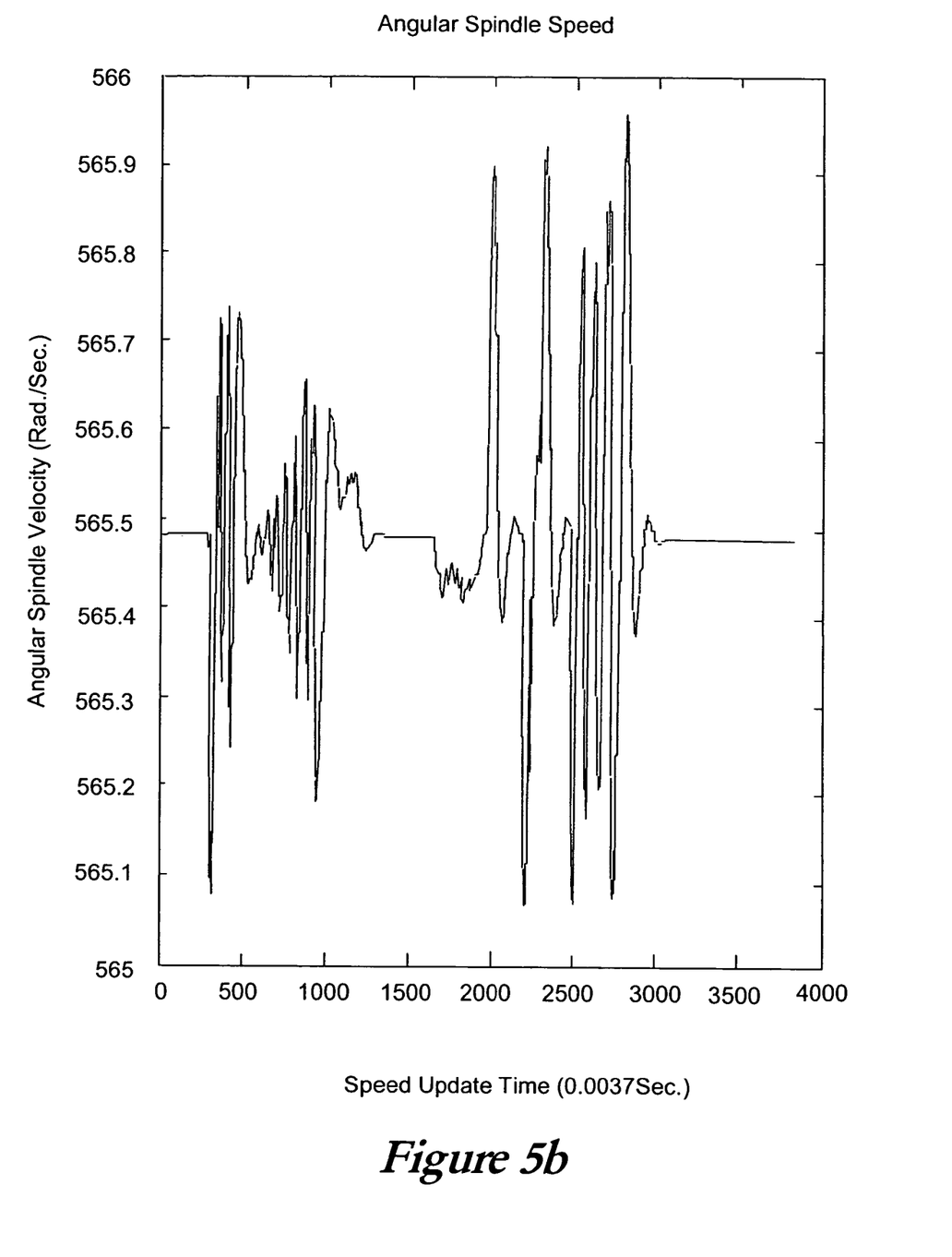
FIG. 5B is a plot of simulation results illustrating a change in spindle speed during the simulation of FIG. 5A.

Performance of the hard disk drive 100 was simulated to demonstrate the effects of load variation on spin speed. FIG. 5A is a plot reproducing results from the simulation model showing multiple spindle load torque changes resulting from simulated changes in head 116 position. FIG. 5B is a plot showing the resulting angular velocity of the simulated spindle 108. As can be seen by overlapping the angular velocity plot and the spindle load torque change plot, the closed-loop system responds to increases in spindle load torque by attempting to increase spin speed, causing the resulting spin speed to "overshoot" its target as the actuator 110 stops moving and the load torque stabilizes. The range in the variability of spin speed over the fourteen second simulation approaches 0.9 rad/sec, or roughly 7.6 rpm.

Figure 6A:
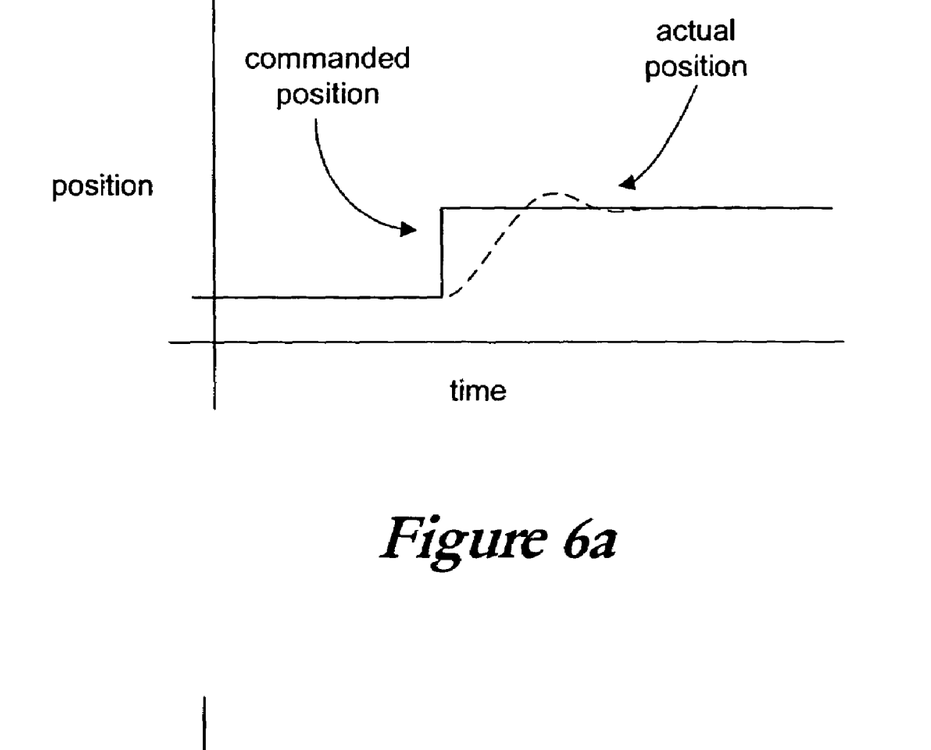
FIG. 6A is a sample plot of the response of a servo system to a change in a position of the head.
Figure 6B:
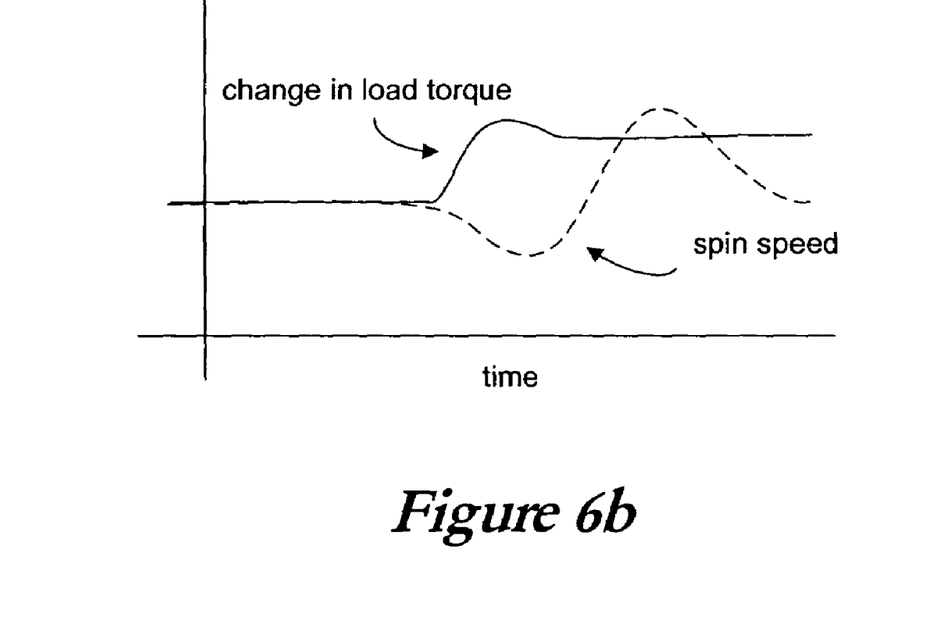
FIG. 6B is a sample plot of a change in spindle speed in response to a change in seek position of the head.

Systems and methods in accordance with the present invention can be applied to reduce spin speed variation due to variation in spindle load torque. An embodiment of a method in accordance with the present invention can include adjusting a target speed of the spindle 108 before, simultaneously with, or just after performing a seek across the disk surface. The adjusted target speed can be calculated to offset an anticipated increase (or decrease) in load torque. For example, the simulation results described above demonstrate an effect of an increase in load torque to initially slow spin speed. An adjusted target speed higher than the target spin speed can be requested to offset the anticipated slowing of the spindle 108. Spin speed response as a result of seek position can be characterized to determine a magnitude and duration of an increase in target speed. Further, spin speed response as a result of a change in requested spin speed can be characterized. For example, FIG. 6A is a sample plot of one possible response of a servo system to a change in the position of the head 116. The plot shows a change in seek position over time. A corresponding spin speed plot is overlayed on top of the position plot. FIG. 6B is a sample plot of a change in spin speed in response to an adjustment in target spin speed. The spindle 108 slows down, and speeds up as the servo system attempts to increase the spin speed of the disk 120. One method of reducing spin speed variation can include matching a response curve associated with an adjustment in target spin speed so as to offset a change in spin speed associated with a seek. A proper response can be selected to nullify the effect of the seek. If calibrated, the spin speed can suffer less transients. An adjustment in target spin speed is selected based on a change in position from an initial position to a target position. A state-space model of the system can be applied to determine the adjusted target spin speed. Given the transients expected from a seek and the transients expected from an adjusted target spin speed, the resulting transients from the seek can be minimized.

Figure 7:
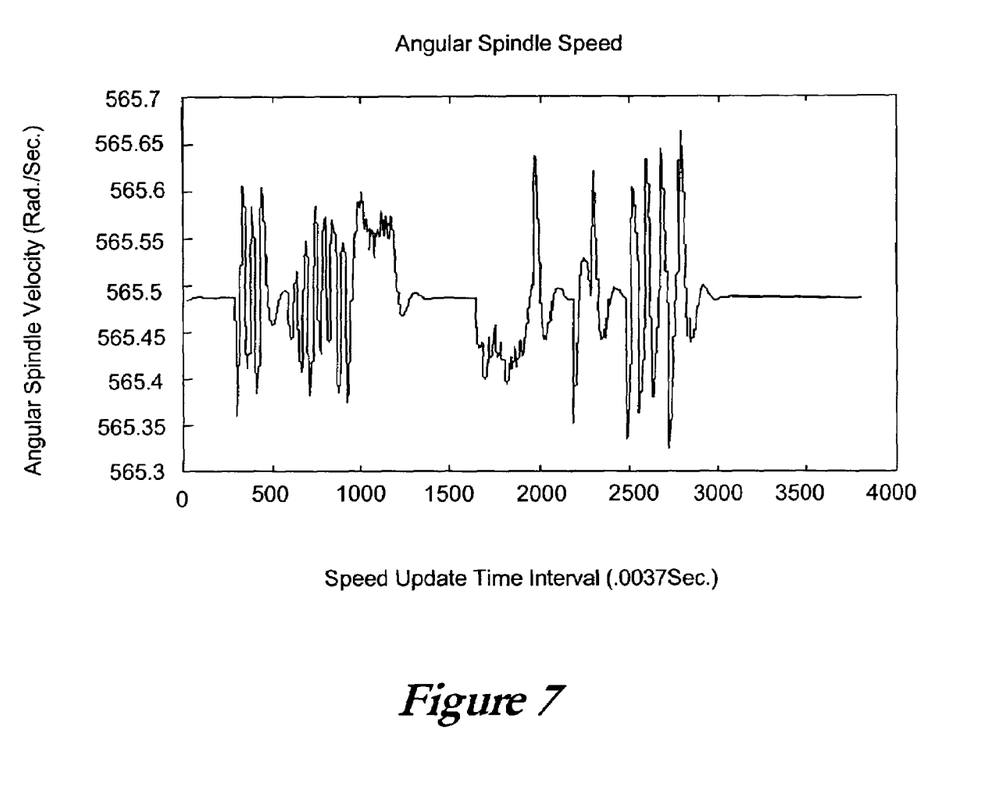
FIG. 7 is a plot of simulation results illustrating a change in spindle speed wherein a method in accordance with one embodiment of the present invention is applied.

A state-space model was applied to the simulation described above. The same series of seeks simulated as shown in FIG. 5A without the state-space model, were performed in the modified simulation. FIG. 7 is a plot reproducing results from the modified simulation showing the resulting angular velocity of the simulated spindle. As can be seen by overlapping the angular velocity plot and the spindle load torque change plot of FIG. 5A, the closed-loop system still responds to increases in spindle load torque by attempting to increase spin speed, causing the resulting spin speed to "overshoot" its target as the load torque stabilizes. However, the range in the variability of spin speed over the fourteen second simulation approaches 0.35 rad/sec, or roughly 3.3 rpm. A significant reduction is achieved—approximately 62%—in the spin speed variation results due to the variation in spindle load torque.

The state-space model for the spindle control loop includes a mechanical plant of the spindle motor comprising a torque constant of the spindle motor, the spindle motor and disk inertial load, and a nominal damping factor representing steady state drag load for the spindle and disk assembly. The state-space model also includes transconductance gain of the spindle motor driver stage that drives current through spindle motor windings, the transconductance gain accounting for saturation effects due to power supply voltage, spindle motor winding resistances, back EMF voltages, and a lead lag compensation network (including an electrical network of two capacitors and one resistor that filter an applied current to produce a voltage use to set the demanded spindle current required from a transconductance amplifier). The transconductance gain also accounts for a programmable frequency, PLL frequency, and phase detector that produces a control current applied to the lead lag network that is selectively proportional to both frequency errors and phase errors between the detected spindle motor speed and position, and the programmable speed and position target. Values for the state-space model variables are based on nominal design values that are readily available. Additionally the effects of spindle load torque variations are taken into account by modulating the applied current to the spindle based on the radial position of the head. Data profiling the spindle steady state run current or run torque to the radial position of the head is derived from empirical results.

An algorithm for calculating an adjusted target speed, or a sequence of adjusted target speeds based on the state-space model can be stored in the microprocessor of the servo system in one embodiment. In other embodiments, the algorithm can be contained in ROM memory, or FLASH memory. In still further embodiments, a database can be maintained for determining an adjust target speed, or for determining a sequence of adjusted target speeds. Such database values can be stored in ROM memory or FLASH memory, for example, and determining appropriate adjusted target speeds can be similar to accessing a table. One of ordinary skill in the art can appreciate the different ways in which the algorithm can be encoded for use in a closed-loop system.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

I claim:

1. A method to reduce a range in variation of a target spin speed for a rotatable medium in a data storage device having a head operably associated with a rotary actuator, the method comprising:

rotating the rotatable medium at the target spin speed;
determining an initial position of the head relative to a surface of the rotatable medium;
determining a target position of the head relative to the surface of the rotatable medium;
determining an adjusted spin speed based at least in part on an approximately repeatable variation in the target spin speed due to motion of the rotary actuator in arranging the head between the initial position and the target position;
sending a signal to rotate the rotatable medium at the adjusted spin speed;
repositioning the head from the initial position to the target position; and
sending a signal to rotate the rotatable medium at the target spin speed.

2. A method to reduce a range in variation of a target spin speed for a rotatable medium in a data storage device, the method comprising:

rotating the rotatable medium at the target spin speed;
determining an initial position of a head relative to a surface of the rotatable medium;
determining a target position of the head relative to the surface of the rotatable medium;
determining an amount of initial drag at the initial position;
determining an amount of target drag at the target positions;
determining an adjusted spin speed based on the initial drag and the target drag;
sending a signal to rotate the rotatable medium at the adjusted spin speed;

repositioning the head from the initial position to the target position; and sending a signal to rotate the rotatable medium at the target spin speed.

3. The method of claim 2, wherein determining an adjusted spin speed further comprises calculating a net change in drag based on the initial drag and the target drag.

4. The method of claim 3, wherein the adjusted spin speed is determined to compensate for the net change in drag.

5. The method of claim 1, wherein determining an adjusted spin speed includes calculating the adjusted spin speed using an algorithm.

6. The method of claim 1, wherein determining an adjusted spin speed includes obtaining the adjusted spin speed from a database.

7. A method to reduce a range in variation of a target spin speed for a rotatable medium in a data storage device, the method comprising:

rotating the rotatable medium at the target spin speed;

determining an initial position of a head relative to a surface of the rotatable medium;

determining a target position of the head relative to the surface of the rotatable medium;

determining a sequence of adjusted spin speeds based on the initial position and the target position;

sending a signal to rotate the rotatable medium through the sequence of adjusted spin speeds;

repositioning the head from the initial position to the target position; and sending a signal to rotate the rotatable medium at the target spin speed.

8. The method of claim 1, wherein determining an initial position of a head relative to a surface of the rotatable medium includes reading servo information from the surface of the rotatable medium with the head.

9. The method of claim 2, wherein:

determining an amount of initial drag at the initial position includes accessing the initial drag from memory based on the initial position; and determining an amount of target drag at the target position includes accessing the target drag from memory based on the target position.

10. A system to reduce a range in variation of a target spin speed for a rotatable medium in a data storage device having a head operably associated with a rotary actuator, the system comprising:

an actuator assembly including a head adapted to access the rotatable medium;

a processor having instruction to:

rotate the rotatable medium at the target spin speed;

determine an initial position of the head relative to a surface of the rotatable medium;

determine a target position of the head relative to the surface of the rotatable medium;

determining an adjusted spin speed based at least in part on an approximately repeatable variation in the target spin speed due to motion of the rotary actuator in arranging the head between the initial position and the target position;

send a signal to rotate the rotatable medium at the adjusted spin speed;

reposition the head from the initial position to the target position; and send a signal to rotate the rotatable medium at the target spin speed.

11. A system to reduce a range in variation of a target spin speed for a rotatable medium in a data storage device, the system comprising:

an actuator assembly including a head adapted to access the rotatable medium;

a processor having instruction to:

rotate the rotatable medium at the target spin speed;

determine an initial position of a head relative to a surface of the rotatable medium;

determine a target position of the head relative to the surface of the rotatable medium;

determine an amount of initial drag at the initial position;

determine an amount of target drag at the target position;

determining an adjusted spin speed based on the initial drag and the target drag;

send a signal to rotate the rotatable medium at the adjusted spin speed;

reposition the head from the initial position to the target position; and send a signal to rotate the rotatable medium at the target spin speed.

12. The method of claim 11, wherein the instruction to determine an adjusted spin speed further includes an instruction to calculate a net change in drag based on the initial drag and the target drag.

13. The method of claim 12, wherein the adjusted spin speed is determined to compensate for the net change in drag.

14. The method of claim 10, wherein the instruction to determine an adjusted spin speed includes an instruction to calculate the adjusted spin speed using an algorithm.

15. The method of claim 10, wherein the instruction to determine an adjusted spin speed includes an instruction to obtaining the adjusted spin speed from a database.

16. The method of claim 10, wherein the instruction to determine an initial position of a head relative to a surface of the rotatable medium includes an instruction to read servo information from the surface of the rotatable medium with the head.

17. The method of claim 11, wherein:

the instruction to determine an amount of initial drag at the initial position includes accessing the initial drag from memory based on the initial position; and the instruction to determine an amount of target drag at the target position includes accessing the target drag from memory based on the target position.

* * * * *